Inventor
Leopold Mambourg.
By Frank Fraser,
Attorney

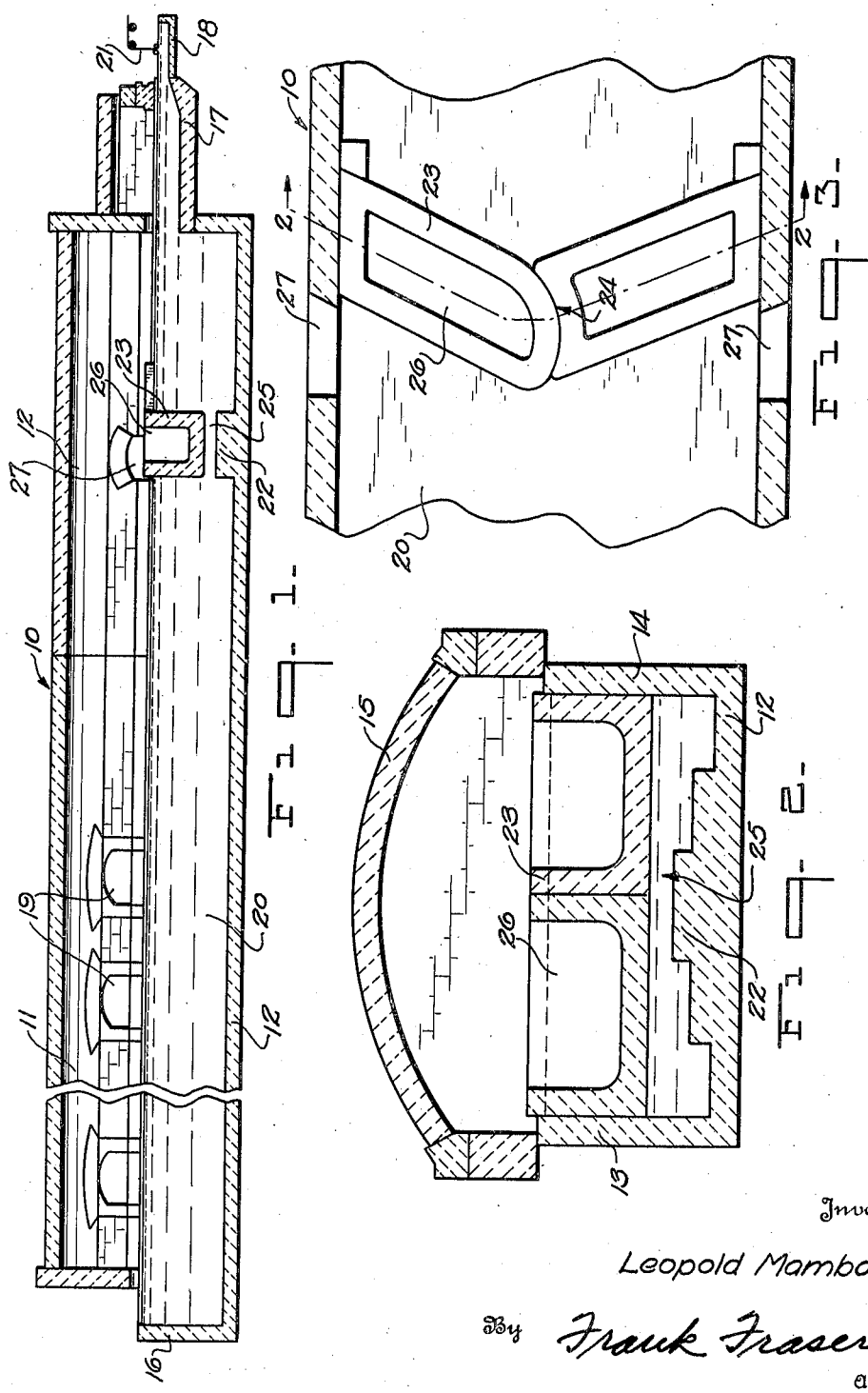

Patented Oct. 27, 1931

1,828,843

UNITED STATES PATENT OFFICE

LEOPOLD MAMBOURG, OF LANCASTER, OHIO, ASSIGNOR TO LIBBEY-OWENS-FORD GLASS COMPANY, OF TOLEDO, OHIO, A CORPORATION OF OHIO

FURNACE CONSTRUCTION

Application filed February 1, 1928. Serial No. 251,084.

This invention relates broadly to furnace constructions and more especially to furnaces of the character commonly used in the manufacture of glassware.

The improved furnace construction contemplated by the present invention is primarily designed for, although not necessarily restricted to, the production and the supplying of molten glass to glassware forming machines and more particularly to means for forming a continuous or substantially continuous glass sheet.

In certain types of furnaces commonly used in the production of sheet glass or other kinds of glassware, the molten glass is produced in one end of the furnace, which is usually termed the melting end, after which the glass is allowed to flow into the opposite or refining end thereof and thence through a cooling zone into a suitable working receptacle.

In the production of molten glass in such a furnace as above described, it has been found that the movement of the stream or body of glass through the furnace is more or less sluggish at its side edge portions due to the frictional resistance of the side walls of the furnace thereon and also to the tendency of the glass to cool at its edges by contact with the walls and consequent loss of heat dissipated therethrough. Thus, the body of glass does not flow uniformly through the furnace throughout its entire width but on the other hand, the hotter central flow of glass will be relatively more rapid than will the cooler border portions thereof.

An important object of the present invention is the provision of a furnace construction whereby the flow movement of the body of molten glass passing therethrough will be substantially equalized throughout its entire width.

Another object of the invention is to provide a furnace construction including a throat arrangement through which the body of glass is caused to pass as it flows from one end thereof to the other, said throat arrangement being so designed as to effect a substantial equalization of the flow movement of the glass passing therethrough.

A further object is to provide in a glass tank furnace, a novel throat arrangement so constructed as to retard the hotter central flow of glass through the furnace to a greater extent than the cooler border portions thereof, whereby to effect a more equalized flow movement of the glass throughout its width.

A more specific object is to provide in a glass tank furnace, a floater throat arrangement relatively narrower at its center than at its ends so as to offer a greater resistance to the hotter central flow of glass passing therethrough than to the cooler border portions thereof, the size of the throat being preferably adjustable in order that the quantity of glass passing therethrough may be controlled as desired.

Other objects and advantages of the invention will become more apparent during the course of the following description when taken in connection with the accompanying drawings.

In the drawings forming a part of this application and wherein like numerals are employed to designate like parts throughout the same.

Figure 1 is a vertical longitudinal section through a furnace constructed in accordance with the present invention.

Figure 2 is a section taken substantially on line 2—2 of Figure 3.

Figure 3 is a top plan view of the throat arrangement, and

Figure 4:
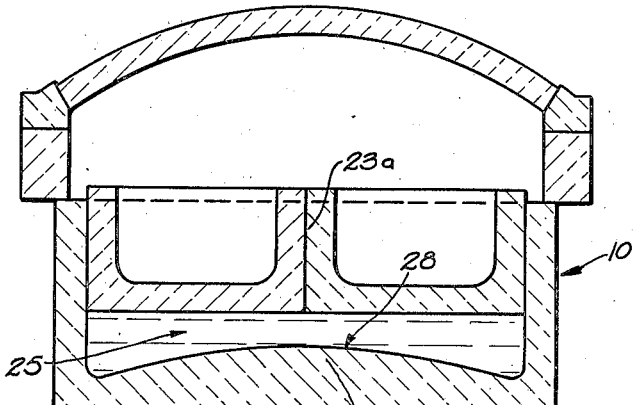
Figure 5:
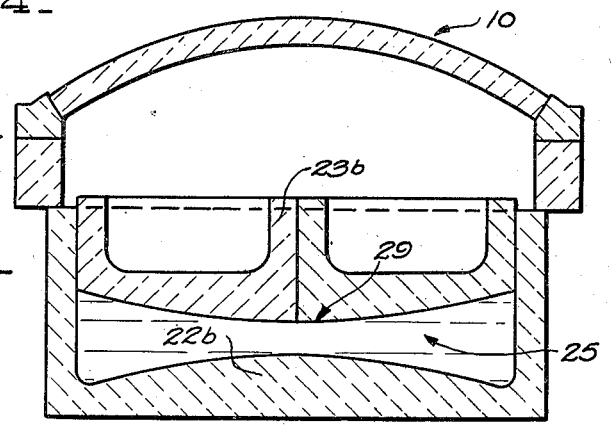
Figure 6:
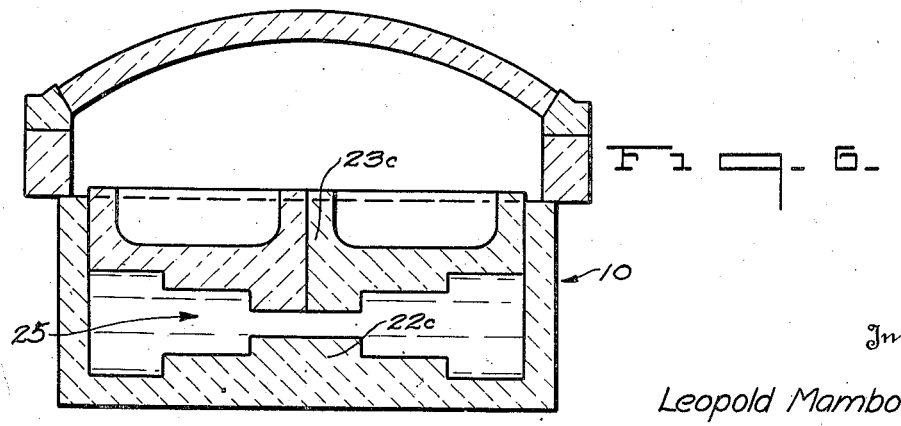

Figures 4, 5, and 6 are vertical transverse sections showing modified forms of the present invention.

The improved furnace construction provided by the present invention comprises a tank 10 including a melting end or chamber 11 and a refining end or chamber 12. These chambers are preferably arranged on the same level and may have, by preference, a common bottom or floor 12, side walls 13 and 14 and a cover arch 15.

The melting end 11 of tank 10 may be provided with an open compartment or dog house 16 for receiving the raw glass batch ingredients introduced into the furnace, while arranged at the opposite end of said tank is a cooling chamber 17 in direct communication with the relatively shallow working receptacle or draw pot 18. The melting of the batch ingredients within the melting end 11 of tank 10 may be accomplished by suitable regenerative heating means or the like located at the opposite sides thereof, the gas flames issuing into the melting end through ports 19.

The molten glass after being produced within the melting end 11 of tank 10 is adapted to flow therethrough into the refining end 12 thereof and thence through the cooling chamber 17 into the working receptacle 18 from which it may be drawn or otherwise removed in sheet form as at 20 or formed into other glass articles as preferred. The particular type of furnace above described is of well known construction and has been chosen simply for the purpose of more clearly illustrating the present invention which, it will be appreciated, may be used in association with any conventional or preferred design of furnace wherein the molten glass or other molten metal is produced in one end thereof and then caused to flow into the opposite end from which it may be worked.

The objects of the present invention are accomplished preferably by the provision of a so-called floater throat arrangement which will now be described in detail. In the form of invention shown in Figures 1 to 3 inclusive, the bottom wall 12 of tank 10 is formed at any desirable point intermediate the ends thereof, but preferably at a point within the refining end 12, with a thickened or raised portion 22 stepped upwardly from both sides toward the center of the tank as clearly shown and extending transversely the entire width thereof.

Arranged within the molten glass above the raised bottom portion 22 is a floater 23 preferably formed from a plurality of sections, the adjacent ends of which abut as at 24 to create a continuous dam across the entire width of the furnace. The floater cooperates with the raised portion 22 to create a throat 25 through which the glass must pass as it flows toward the point of draw or removal from the furnace.

It will be noted from an examination of Figure 2 that the bottom of the floater 23 is substantialy flat and that the said floater cooperating with the raised stepped portion 22 forms a throat which is relatively narrow at its center and which gradually becomes wider toward the opposite sides of the tank. With such an arrangement, the throat will offer a greater resistance to the hotter central flow of glass through the tank than to the cooler border portions thereof with the result that the hotter glass, which ordinarily moves the fastest, will be retarded in its flow to a greater degree than will the cooler border portions which ordinarily move somewhat more sluggish, and as a consequence, the flow of glass as it leaves the throat will be substantially uniform throughout its width. This of course is a desirable condition.

In order to hold the floater sections in position, the said sections are formed with pockets 26 and these pockets are adapted to be filled with suitable ballast such as molten glass or cullet, the amount of ballast used depending upon the depth at which it is desired to maintain the floater within the glass. By increasing or lessening the ballast, the floater can be caused to sink or rise within the molten glass and thus vary the size of the throat 25 as desired to control the amount of glass passing therethrough.

Also, in the manufacture of molten glass, a certain amount of scum or comparatively dirty surface is formed on the mass of glass usually within the melting end of the furnace and the floater herein provided will prevent this scum or comparatively poor quality of glass from passing into the glass articles being made. The floater is arranged to dam up or retard the upper surface of the glass and the floater sections are so arranged as to create a side movement of this glass toward the opposite sides of the furnace so that the scum or poor quality of glass can be skimmed off through the skimming holes 27.

The inventive idea hereinabove expressed may take a variety of different forms as will be evident from an inspection of Figures 4, 5, and 6. In Figure 4, the upper surface of the raised portion 22a of tank 10 is arcuately curved transversely thereof as at 28 instead of being stepped as in Figure 2. In Figure 3, the upper surface of the raised portion 22b is also arcuately curved and the bottom of the floater 23b is correspondingly curved as at 29 while in Figure 6, the raised portion 22c is stepped upwardly from both sides of the furnace toward the center thereof and the bottom of the floater 23c is correspondingly but inversely stepped as shown. In all of these forms, however, it will be seen that there is created a throat relatively narrower at its center than at its ends in order that the hotter and more rapid flow of glass through the furnace will be retarded to a greater degree than will the cooler border portions and the flow of glass in this manner made more nearly uniform.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A furnace adapted to contain a mass of molten glass and including a melting end and a working end for receiving the molten glass from said melting end, the bottom of said furnace being formed with a raised portion at substantially the transverse center thereof, and a floater having a depending portion also at substantially the transverse center of said furnace and positioned directly above the raised portion, said floater cooperating with said raised portion to form a throat through which the glass passes from said melting end into said working end.

2. A furnace adapted to contain a mass of molten glass and including a melting end and a working end for receiving the molten glass from said melting end, the bottom of said furnace being formed with a raised portion at substantially the transverse center thereof, and a floater positioned directly above the raised portion and cooperating therewith to form a throat through which the glass passes from said melting end into said refining end, said floater dipping into the molten glass to a greater depth at substantially the transverse center of the furnace than at its opposite sides.

3. A furnace adapted to contain a mass of molten glass and including a melting end and a working end for receiving the molten glass from said melting end, the bottom of said furnace being formed with a raised portion, and a floater positioned directly above the raised portion and cooperating therewith to form a throat through which the glass passes from said melting end into said refining end, said floater dipping into the molten glass to a greater depth at substantially the transverse center of the furnace than at its opposite sides, and the raised portion projecting upwardly to a greater height also at substantially the transverse center of the furnace than at its opposite sides.

4. A furnace adapted to contain a mass of molten glass and including a melting end and a working end for receiving the molten glass from said melting end, the bottom of said furnace being formed with a raised portion, and a floater positioned directly above the raised portion and cooperating therewith to form a throat through which the glass passes from said melting end into said working end, the said raised portion and floater projecting into the mass of molten glass within the furnace to the greatest extent at substantially the transverse center of said furnace and progressively less toward the opposite sides thereof.

5. A furnace adapted to contain a mass of molten glass and including a melting end and a working end for receiving the molten glass from said melting end, the bottom of said furnace being formed with a raised portion, and a floater positioned directly above the raised portion and cooperating therewith to form a throat through which the glass passes from said melting end into said working end, the upper and lower walls of the throat being correspondingly but inversely shaped and projecting into the mass of molten glass within the furnace to the greatest extent at substantially the transverse center of said furnace and progressively less toward the opposite sides thereof.

6. A furnace adapted to contain a mass of molten glass and including a melting end and a working end for receiving the molten glass from said melting end, the bottom of said furnace being formed with a raised portion, and a floater positioned directly above the raised portion and cooperating therewith to form a throat through which the glass passes from said melting end into said working end, the upper wall of the throat having an irregular contour and the bottom wall thereof being correspondingly but inversely shaped, the said upper and lower walls of said throat projecting into the mass of molten glass within the furnace to a greater extent at substantially the transverse center of said furnace than at its opposite sides.

Signed at Lancaster, in the county of Fairfield and State of Ohio, this 27th day of January, 1928.

LEOPOLD MAMBOURG.